Nov. 5, 1968  M. F. SCHULTZ ET AL  3,409,896
AIRCRAFT TRAFFIC COUNTER
Filed June 15, 1966  2 Sheets-Sheet 1
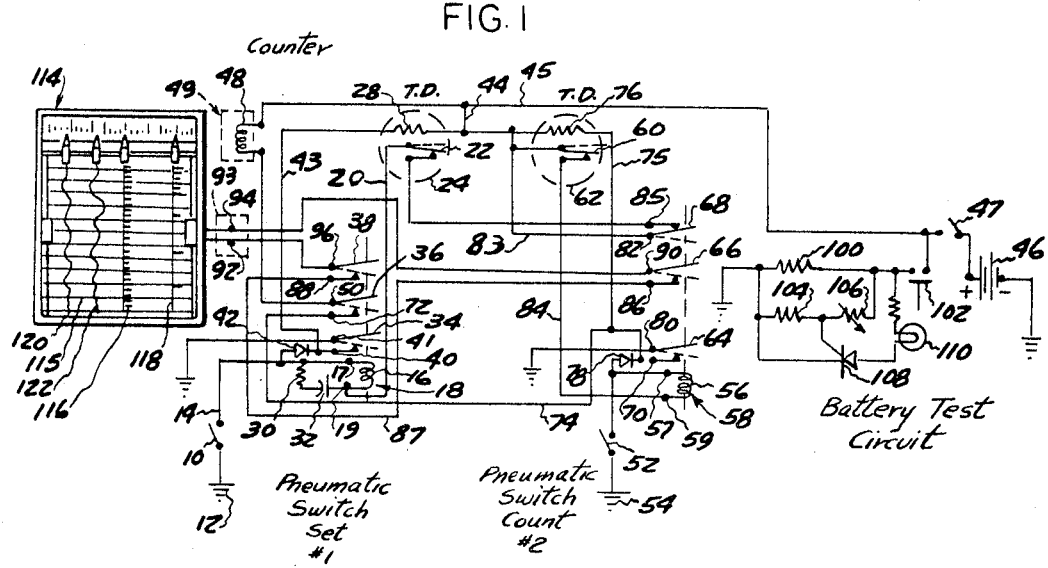
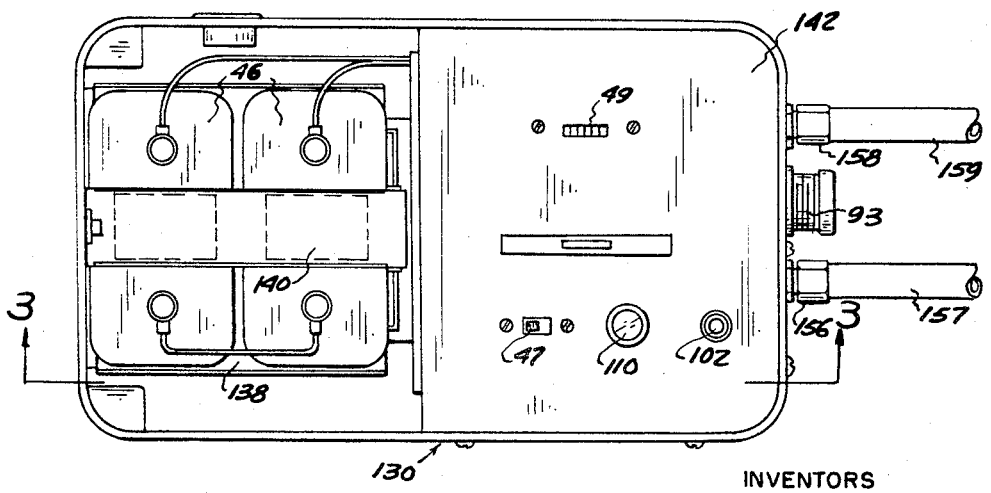
INVENTORS
MARTIN F. SCHULTZ
JOHN R. EVA
BY *Haulk, Krass, & Gifford*
ATTORNEYS

INVENTORS
MARTIN F. SCHULTZ
JOHN R. EVA

BY *Hauke, Krass, & Gifford*
ATTORNEYS

3,409,896
AIRCRAFT TRAFFIC COUNTER

Martin F. Schultz, 2521 Lafayette Ave. 48906, and John R. Eva, 5013 Alpha 48910, both of Lansing, Mich.
Filed June 15, 1966, Ser. No. 557,813
5 Claims. (Cl. 346—33)

ABSTRACT OF THE DISCLOSURE

An airport aircraft traffic counter which prevents multiple count for each taxiing aircraft, irrespective of the number of wheels of such aircraft, by having a first relay activated by the passage of the first wheel of the aircraft over a relay tripping member, such relay being arranged to start a time delay permitting a second relay to operate if actuated during the period of time predetermined by the time delay. Upon actuating of the second relay, a count is recorded, and a second time delay is set preventing subsequent counts during a second predetermined period of time as set by the second time delay, such that no count is recorded in spite of the successive passage of the aircraft's other wheels upon the tripping mechanism. Additionally, a chart recorder may be connected to the traffic counter so as to supply a graphic representation of aircraft traffic in function of time and relatively to other information such as meteorological information and the like.

---

The present invention relates to an aircraft traffic counter and more particularly to a counter arrangement capable of registering a count when tripped by a taxiing aircraft transiting in a predetermined direction.

Up to the present there has been an unfulfilled need for an accurate, reliable counting device capable of counting the number of aircraft using the facilities of an airport. Such a counting device must be capable of counting the number of aircraft transiting over a particular section of a taxi strip or runway, either after landing or before take-off, the traffic count at a particular airport being based either on the number of landings or take-offs, preferably on the number of take-offs.

Adaptation of highway traffic counters to airport traffic applications have generally not been very successful, because highway traffic counters are fast rate counting devices, while aircraft traffic counting requires a slow rate unit which is capable of giving an accurate count when operated in conjunction with a substantially wide taxi strip or runway, and which must be capable of being tripped by an aircraft, irrespective of the size or weight thereof, and irrespective of the number of wheels of the landing gear. In addition, the problem of aircraft traffic counting is complicated by the fact that the counter tripping mechanism, consisting generally of air hoses laid on the top of the taxi strip or moving pavement must be actuated by an aircraft transiting in one direction only, and be disabled from counting aircraft transiting in an opposite direction. Also, an aircraft traffic counter must be capable of giving one count only with respect to a passing aircraft, irrespective of the angle between the axis of translation of the aircraft with respect to the tripping mechanism.

Some attempts have been made at developing aircraft traffic counters which are sound actuated. Such counters are far from being accurate because it is difficult to make them direction sensitive, and in addition, they may be tripped by a sound of an appropriate frequency and of a predetermined amplitude originated from one aircraft only but being pulsed in a manner giving erroneous control signals.

The present invention, therefore, consists of an aircraft traffic counter which is capable of providing a count for each aircraft transiting over a predetermined section of a taxi strip or runway, which is responsive to the direction of translation of each aircraft and which includes a built-in delay arrangement preventing tripping by successive wheels of an aircraft landing gear. A counter according to the present invention utilizes two lengths of air hoses strung across the pavement of a taxi strip or runway connected to pressure switches which must be operated in proper sequence in order to provide a count. When the pressure switches are operated in the wrong sequence, no count is registered. In order to prevent multiple count with respect to a single aircraft, the counter of the invention has incorporated therein a time delay arrangement providing a delay of about three to fifteen seconds, preferably ten seconds, during which the counter is inhibited from recording another count. In addition, the counter of the present invention is self-contained in a portable, dust-proof and water-proof housing and contains its own power supply consisting of dry cell batteries, or rechargeable batteries, so as to be independent from normal electrical power. The aircraft traffic counter of the invention further includes a simple battery condition tester, and has provision for connection to another instrument, such as a chart recorder, for providing, for example a permanent and timed traffic density record.

The principal object of the invention, consequently, is to provide an aircraft traffic counter capable of giving an accurate slow rate count of aircraft traffic over a section of a taxi strip or runway.

Another object of the present invention is to provide an aircraft counter capable of giving a count when an aircraft transit over a tripping mechanism in a predetermined direction only, and no count when an aircraft transit in an opposite direction.

A further object of the present invention is to provide a slow rate aircraft traffic counter having time delay means preventing registration of another count for a predetermined time after a count has been registered so as to provide only one count for each transiting aircraft irrespective of the number of wheels of the landing gear of the aircraft.

Yet another object of the invention is to provide an aircraft traffic counter having self-contained dry cell or its own independent power supply consisting of rechargeable batteries, with a built-in battery condition tester.

Yet a further object of the invention is to provide an aircraft traffic counter having an output plug permitting connection to another instrument such as a chart recorder.

Still another object of the invention is to provide an aircraft traffic counter in combination with such a chart recorder so as to permit analysis of aircraft traffic conditions at a given airport.

Still a further object of the invention is to provide an aircraft traffic counter which is substantially low in cost, which is simple and easy to manufacture, which requires practically no maintenance other than an occasional battery condition test and battery replacement when necessary, which is sturdy and not easily damaged, which is capable of working accurately in any ambient temperature or weather condition.

Other objects and advantages of the present invention will become apparent when the following description of a preferred embodiment thereof is considered in conjunction with the accompanying drawings wherein:

FIG. 1 is a simplified schematic diagram of an example of an aircraft traffic counter according to the principles of the invention;

FIG. 2 is a top plan view, with housing cover removed, of an example of a practical embodiment of an aircraft traffic instrument according to the invention;

Figure 3:
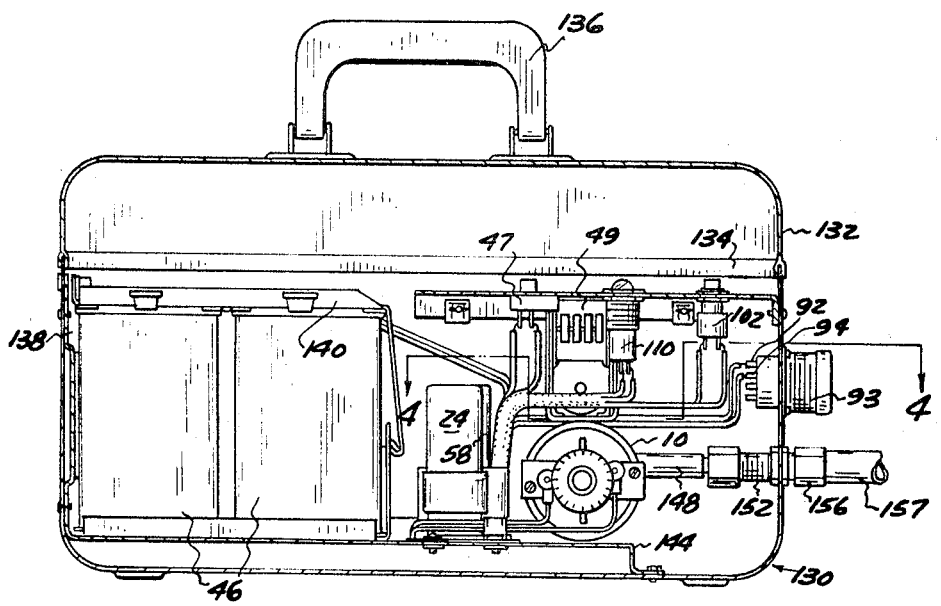
FIG. 3 is an elevational view of the instrument of FIG.
Figure 4:
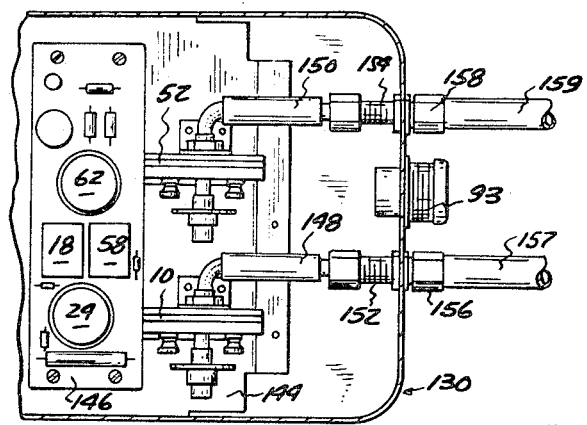

2, with the cover in position, and with a section of a side panel removed so as to show the internal configuration as seen substantially from line 3—3 of FIG. 2; and FIG. 4 is a partial plan view of a portion of the instrument of FIGS. 2–3, as seen substantially from line 4—4 of FIG. 3.

Referring now particularly to FIG. 1 of the drawings, an example of a preferred embodiment of an aircraft traffic counter according to the invention comprises a pair of flexible hoses, such as rubber air hoses, not shown, stretched substantially parallel to each other and a short distance from each other across a section of an airport taxi strip or runway. The air hoses may be each fifty to three hundred feet long, are normally, as is well known in the art, filled with air at atmospheric pressure and are provided with a closure plug on one end thereof, the other end being connected to the appropriate pneumatic switch. As shown in FIG. 1, a first pneumatic switch 10 has one terminal grounded such as shown at 12, and its other terminal connected by way of a line 14 to the terminal 17 of the coil 16 of a first relay designated generally at 18. The other terminal 19 of coil 16 is connected by way of a line 20 to the heat operable contact 22 of a normally closed thermal delay switch 24 provided with a heating element 28. A shunt network placed across the coil 16 of relay 18 consists of a resistor 30 in series with a capacitor 32.

Relay 18 is adapted to actuate normally open switches 34, 36 and 38. Line 14 is connected to a terminal 40 of switch 34 through a diode 42, terminal 40 of switch 34 being also connected via a line 43 to a terminal of the heater 28 of thermal delay switch 24, the other terminal of the heater 28 being connected via line 44 to a bus line 45. Bus line 45 is in turn connected to the positive terminal of a battery power supply 46 through an on and off switch 47. To the bus line 45 is also connected one end of the relay coil 48 of a counter 49. The other end of the counter relay coil 48 is connected to a terminal 50 of switch 36.

A second pneumatic switch 52 has one terminal tied to ground, as shown at 54, and its other terminal connected to a terminal 57 of the coil 56 of a second relay 58, the other terminal 59 of the relay coil being connected through the normally closed thermal delay switch 60 of a second time delay switch 62 to the bus line 45, via line 44. Relay 58, when activated as a result of pneumatic switch 52 being closed, is adapted to operate normally open switch 64, normally open switch 66 and normally closed switch 68. Switch 64 has a terminal 70 connected to the second terminal 72 of switch 36 through a line 74, and to one end of the heater 76 of second thermal relay 62 through a line 75, the other end of the heater 76 being connected to the bus line 45 via line 44. A diode 78 is connected such that its anode is connected to terminal 57 of coil 56 of relay 58 and its cathode is connected to terminal 70 of normally open switch 64. The other terminal 80 of normally open switch 64 is grounded, as shown in the drawing.

Normally closed switch 68 has a terminal 82 connected both to the bus line 45, via a line 63 and line 44, and to the other end of coil 56 of relay 58 through switch 60 of thermal relay 62 and a line 84. The other terminal 85 of switch 68 is connected across switch 22 of thermal delay 24 to terminal 19 of coil 16 of first relay 18. Terminal 86 of normally open switch 66 is tied, via a line 87, to terminal 88 of first relay actuated switch 38, and terminal 90 of switch 66 is connected to an output terminal 92 of an output connector 93, another output terminal 94 of which is connected to terminal 96 of first relay operated switch 38.

As can be seen in FIG. 1, the negative terminal of battery power supply 46 is tied to ground, and a battery condition test circuit is provided by a circuit adapted to discharge the battery across a load 100 when push-button actuated switch 102 is closed. Across load resistor 100 is placed a voltage divider network consisting of series connected fixed resistor 104 and adjustable resistor 106. A silicon controlled rectifier (SCR) 108 has its gate tied to the junction between fixed resistor 104 and adjustable resistor 106, its cathode connected to ground and its anode connected to the positive terminal of the battery power supply 46 when both switches 47 and 102 are closed, through indicator lamp 110 and current limiting resistor 112. When it is desired to test the condition of the battery 46, with the on and off switch 47 closed, push-button switch 102 is closed. Current is thus caused to flow mostly through load resistor 100 having a much lower resistance than the resistance of the shunt comprising fixed resistor 104 and adjustable resistor 106 in series. The adjustable resistor 106 has been originally adjusted in such a manner that the gate of SCR 108 is placed at a predetermined intermediary voltage between ground and the voltage of the positive terminal of the battery 46 that causes the gate to turn SCR 108 on, thus causing a flow of current through indicator lamp 110, this current being limited by limiting resistor 112. When the battery 46 is discharged to a point that a voltage across load resistor 100 is insufficient to cause the voltage at the gate of the SCR 108 to turn the SCR on, lamp 110 does not light. This is an indication that the battery 46 needs to be replaced, or in the event that a rechargeable battery is used, that the battery needs to be recharged.

When a taxiing aircraft transiting over the air hose connected to first pneumatic switch 10 causes an increase of pressure within the hose as a result of the passage of a landing wheel of the aircraft over the hose, pneumatic switch 10 closes, thus placing terminal 17 of coil 16 of first relay 18 to ground potential. With switch 47 closed, electrical current flows through the coil 16 from the positive terminal of power supply battery 46 via lines 45, 44 and 83, normally closed switch 68 and line 20. Consequently, first relay 18 is activated, and normally open switches 34, 36 and 38 are closed. When first pneumatic switch 10 opens, due to the aircraft landing gear wheel no longer depressing the air hose, current continues to flow through coil 16 of first relay 18, thus maintaining switches 34, 36 and 38 engaged in a closed position, because the current return to ground is now effected from terminal 17 of the coil 16 across forward connected diode 42 to terminal 40 of closed switch 34 and from terminal 41 of switch 34 to ground. At the same time, current also flows across heater 28 of thermal time delay relay switch 24 from bus line 45, through line 44 to line 43, across the heater, to now grounded terminal 40 of closed switch 34. Consequently, heater 28 is caused to heat up the bimetallic elements forming switch 22 of thermal time delay 24 for a predetermined period of time until the thermally caused distortion of the bimetallic elements cause switch 22 to open.

Switch 36 being also closed, terminal 70 of switch 64 of second relay 58 "sees" the positive potential of bus line 45 through relay coil 48 of the counter 49, closed switch 36 and line 74. However, the counter 49 is not actuated because of switch 64 being still open. Assuming that thermal time delay 24 provides a time delay of ten seconds, if, within that period of time, the first wheel of the transiting aircraft depresses the second air hose connected to the second pneumatic switch 52, switch 52 closes, thus placing the coil 56 of second relay 58 across the voltage supply of battery 46, by causing terminal 57 of coil 56 to be grounded while terminal 59 of the coil is connected to bus line 45 through line 84, normally closed switch 60 of thermal time delay 62 and line 44. Relay 58 thus trips the switches associated therewith so that switches 64 and 66 close and switch 68 opens. The closure of switch 64 causes the end of counter relay coil 48 connected to line 74 to become grounded so that the counter 49 is actuated so as to advance the count registered thereby by one unit.

In addition, as a result of switch 64 being closed, current flows through the heater 76 of thermal time delay 62, from bus line 45 to line 44, across heater 76 to line 75, to terminal 70 now at ground potential. Switch 66 being now closed, a circuit is also established between terminals 92 and 94 of output connector plug 93 through closed switch 66, line 87, and closed switch 38. The closure of that circuit causes an instrument, connected to terminals 92 and 94, such as chart recorder 114, to operate, for the purpose to be hereinafter explained in further details.

When second relay 58 was activated, switch 68 associated therewith became open, so that the circuit from terminal 19 of the coil 16 of first relay 18 to bus line 45 is now open. Consequently, first relay 18 would immediately release if it were not for capacitor 32 having been charged through resistor 30 while the power voltage supply was across coil 15. The discharge current of capacitor 32 across coil 16 causes relay 18 to remain energized for a period of time depending from the RC constant of the circuit comprising resistor 30, capacitor 32 and coil 16. Consequently after first relay 18 is engaged, the actuation of second relay 58 during the period of time that switch 22 of thermal time delay 24 remains closed causes a count to be recorded and first relay 18 to become disengaged after a short time delay. When second pneumatic switch 52 opens, current continues to flow through the coil 56 of second relay 58, as a result of switch 64 being closed, causing the current ground return to be effected from terminal 57 of coil 56, across diode 78 to grounded terminal 70 of closed switch 64. Current also flows from bus line 45 and line 44, across heater 76 of thermal time delay 62 to line 75 and to grounded terminal 70 of switch 64. Second relay 58 remains engaged as long as switch 60 of thermal delay 62 is closed. After a predetermined delay period, such as, for example, ten seconds, the heat generated by heater 76 of thermal delay 62 warps the bimetallic elements forming switch 60 sufficiently to cause it to open, with the result that terminal 59 of coil 56 of relay 58 is no longer connected to bus line 45. Consequently switches 64 and 66 are caused to return to their open positions and switch 68 is caused to return to its closed position as shown in full lines in the drawing.

If pneumatic switch 52 is not caused to close within the delay period during which switch 22 of thermal time delay 24 is closed, after switch 22 opens no count will be registered when pneumatic switch 52 closes. If switch 22 opens before second relay 58 is activated, first relay 18 becomes deenergized as soon as capacitor 32 has been discharged across coil 16 of the relay and when switch 52 subsequently closes, no current can circulate through the coil 56 of second relay 58 because the relay coil circuit is open as a result of switch 36 associated with first relay 18 being now open.

If second pneumatic switch 52 is closed first, the circuit of coil 56 of second relay 58 is established from ground through closed switch 52 across coil 56, from terminal 57 to terminal 59 thereof, through normally closed switch 60 of thermal delay 62, to bus line 45 via line 44. Relay 58 being activated, switches 64 and 66 operated thereby close, and switch 68 opens. The relay remains on, even after pneumatic switch 52 opens, because switch 64 being now closed, a ground return circuit is established for coil 56 from terminal 57, across diode 78 to terminal 70 of switch 64 being now placed at ground potential. Although switch 64 is closed, counter 49 is not caused to register a count as its relay coil 48 has its return circuit to ground open between terminals 50 and 72 of open switch 36.

When relay 58 is activated, the closure of switch 64 creates a ground return path for the current to flow from bus line 45 across heater 76 of thermal time delay 62, and to line 75 connected to now grounded terminal 70 of switch 64. Second relay 58 thus normally remains on until switch 60 of thermal time delay 62 opens, after a predetermined period of time of three to fifteen seconds, thus opening the connection from terminal 59 of coil 56 to bus line 45. Relay 58 remaining activated for the time determined by thermal time delay 62, first relay 18 is inhibited from being activated for that period of time.

It can thus be seen that counter 49 registers a count only when the following conditions are present: an airplane is taxiing in the direction that causes pneumatic switch 10 to be tripped first so as to activate first relay 18 first in order to "set" second relay 58 in a ready state permitting a count to be registered if second pneumatic switch 52 is closed during the time period as determined by thermal time delay 24. As soon as a count is registered, further closing of second pneumatic switch 52 during the period of time as determined by thermal time delay 26 causes no count to be registered.

Diodes 42 and 78 in the circuit of FIG. 1 have for function to prevent inverse by-pass current flow by-passing the coils 16 and 56 of relays 18 and 58, respectively when they close or open, so as to prevent any chatter of the relays, contacts. As an alternate to the use of the diodes, the branches of the circuit in which the diodes are connected could be open and connected to the free terminals of normally open switch actuated by the respective relays.

As previously mentioned a recording instrument or the like, such as a chart recorder 114, for example, adapted for any appropriate purpose, such as analysis of traffic density at a given airport, may be connected to the output connector 93 of a traffic counter according to the invention. Chart recorder 114 is preferably a multichannel recorder having a channel providing a permanent record of aircraft traffic count on a chart 115 in the form of a trace 116 and having a time reference channel, providing a time reference trace, such as shown at 118, which permits to determine an exact count of transiting aircraft within a predetermined period, such as an hour, at different times of a day.

In addition, other channels of the chart recorder 114 may provide graphic representations or traces of further useful information such as temperature, wind velocity and direction, etc. Two such traces are shown on chart 115 with respect to the chart recorder 114 as shown at 120 and 122.

FIGS. 2–4 represent several views of a commercial embodiment of an air traffic counter according to the present invention. A housing 130 which contains and encloses all the components is provided with a removable cover 132, a sealing gasket 134 being disposed at the junction between the edge of the housing and the cover edge. The cover 132 can be latched upon the housing by conventional latching means, not shown, and has attached on the top thereof a carrying handle 136 as seen in FIG. 3.

Within housing 130 there is disposed a power supply compartment 138, best seen in FIGS. 2 and 3, which securely contains a pair of commercial 6 v. dry cell batteries 46 connected in series so as to provide 12 v. and held in position by means of a clip 140, in a conventional manner. On the upper portion, as seen in FIGS. 2 and 3, of the housing 130 is attached a panel 142 on which are mounted the on-and-off switch 47, the battery condition test push button switch 102, the battery condition indicator lamp 110, and the counter 49. Proximate the bottom of the housing, there is mounted, by any conventional means such as screws or rivets, a mounting panel 144, a portion of which form the bottom wall of the battery compartment 138 and on which is mounted a circuit board 146 supporting the relays 18 and 58, the thermal time delay tubes 24 and 62 and the diverse other electrical components of the circuit of FIG. 1.

On mounting panel 144 are also fastened the two pneumatic switches 10 and 52 provided respectively with pipes 148 and 150 having fittings 152 and 154 adapted to project through a sidewall of the instrument housing 130 and provided with terminal fittings 156 and 158 for connection to air hoses, as shown at 157 and 159 respectively.

The housing 130 is also provided on a side wall thereof with an output connector 93 for connection to an external auxiliary instrument, such as the chart recorder, as shown at 114 in FIG. 1, output plug 93 having output terminals 92 and 94.

From the foregoing description it will be apparent that there has been provided an improved aircraft traffic counter which is especially suited for providing an accurate count of aircraft transiting in a predetermined direction over a section of a taxi strip or runway, irrespective of the size or weight of each aircraft, and irrespective of the design of its landing gear.

What is claimed as new is:

1. An aircraft traffic counter adapted to be activated by an aircraft taxiing in a predetermined direction, said counter comprising:

a source of electrical power;

a first and a second compressible air hose disposed in the path of said aircraft a predetermined distance from each other;

a first and a second normally open pressure switch each adapted to be momentarily closed by an increase of pressure in respectively said first and second hoses caused by the transit of the wheels of said aircraft thereover;

a first and a second electrical relay adapted to be activated respectively by said first and second pressure switches when momentarily closed;

normally open first, second and third switches adapted to be actuated by said first relay and normally open fourth and fifth switches and normally closed sixth switch adapted to be actuated by said second relay, wherein said first switch is connected to place said first relay across said source of electrical power through said sixth switch for maintaining said first relay in an activated state;

a first normally closed thermal time delay switch adapted to be activated by said first switch so as to open after a first predetermined period of time, said first time delay switch being electrically connected between said second switch and said second relay whereby said second relay is activated by said second pressure switch only when said first time delay switch is closed;

electrical counter means electrically interconnected in series with said third and fourth switches for giving a count as a result of said second relay being activated while said first relay is still activated;

a second normally closed thermal time delay switch adapted to be activated by said second relay upon closure of said fifth switch so as to open after a second predetermined period of time, said second time delay switch being adapted to inhibit said second relay from actuating said electrical counter means by maintaining said second relay in an activated state for said second predetermined period of time whereby only one count for each aircraft is recorded notwithstanding the number of wheels of said aircraft; and a capacitor connected across said first relay and adapted to discharge through a resistor for maintaining said first relay activated for a predetermined period of time after said sixth switch opens.

2. The counter of claim 1 further comprising:

a multi-channel chart recorder adapted to graphically record a count through a channel thereof in coincidence with the count registered by the electrical counter means; and clock means dependent from said chart recorder and adapted to graphically record time intervals between consecutive counts through a second channel of said chart recorder.

3. The counter of claim 2 wherein said chart recorder comprises at least a third channel adapted to supply meteorological information.

4. The counter of claim 1 wherein each of such said predetermined periods of time is comprised between three and fifteen seconds.

5. The counter of claim 1 wherein said source of electrical power is a direct current battery further comprising battery condition test means comprising a resistance network adapted to be controllably connected across said battery and a silicon controlled rectifier having a gate electrically connected to an intermediate point of said resistor network and an indicator lamp in series with said battery in the anode-cathode circuit of said silicon controlled rectifier, whereby said silicon controlled rectifier is biased to conduction only if there is a predetermined voltage across said battery.

References Cited

UNITED STATES PATENTS

| | | | |
|---|---|---|---|
| 2,927,836 | 3/1960 | Shore | 346—107 |
| 2,927,837 | 3/1960 | Martin | 346—107 |
| 2,950,159 | 8/1960 | McCulley et al. | 346—59 |

RICHARD B. WILKINSON, *Primary Examiner.*

EDITH C. SIMMONS, *Assistant Examiner.*